Oct. 7, 1969

C. T. BUTTON 3,471,730

D.C. SERIES MOTOR WITH LAMINATED FIELD
STRUCTURE OF DIVERSE MATERIALS

Filed Dec. 30, 1966

Charles T. Button,
Inventor.
Koenig, Senniger, Powers and Leavitt,
Attorneys.

United States Patent Office 3,471,730
Patented Oct. 7, 1969

3,471,730
D.C. SERIES MOTOR WITH LAMINATED FIELD STRUCTURE OF DIVERSE MATERIALS
Charles T. Button, Dayton, Ohio, assignor to Texas Instruments Incorporated, Dallas, Tex., a corporation of Delaware
Filed Dec. 30, 1966, Ser. No. 606,213
Int. Cl. H02k 23/26
U.S. Cl. 310—177          3 Claims

ABSTRACT OF THE DISCLOSURE

A D.C. series motor is provided in which the field structure includes similar laminations of two different kinds of metal. One of the metals is of a type, such as soft iron, having a relatively high magnetic permeability and the other metal is a type, such as cunife alloy, which has a relatively high retentivity. Accordingly, the field structure applies to the motor's armature a polarizing field having a magnitude which at relatively low speeds varies principally as a function of the current in the motor's series-connected windings and which at relatively high speeds is reinforced by the field of the metal having high retentivity thereby providing a substantial counter E.M.F. in the armature winding at substantially all speeds.

Background of the invention

As is understood by those skilled in the art, conventional series connected D.C. motors are difficult to control and may tend to run away under light loads since the counter E.M.F. generated in the armature winding falls off with decreasing current in the series connected windings. This lack of a substantial counter E.M.F. at some speeds also makes it difficult to provide dynamic braking and makes such motors difficult to speed control by means of electronic circuits which employ armature voltage as a measure of motor speed. Such speed control problems are particularly objectionable when the motor is variably energized with rectified A.C. which is phase angle modulated to vary the energization of the motor.

Summary of the invention

Among the several objects of the present invention may be noted the provision of a D.C. series motor in which a substantial counter E.M.F. is developed in the armature winding at substantially all speeds; the provision of such a motor which does not "run away" under light loading; the provision of such a motor which may be dynamically braked; the provision of such a motor which may be speed controlled by electronic means responsive to armature voltage; the provision of such a motor which may be operated on phase angle modulated A.C.; the provision of such a motor which is highly reliable; and the provision of such a motor which is simple and relatively inexpensive. Other objects and features will be in part apparent and in part pointed out hereinafter.

Briefly, a D.C. series motor according to this invention includes an armature having windings thereon and a commutator for applying current to the armature windings. A field structure is provided having a plurality of poles which are magnetically coupled to the armature. The field structure incorporates magnetic circuit means including both a magnetizable material of relatively high permeability and a magnetized material of relatively high retentivity. A winding on the field structure links the magnetic circuit means for polarizing the poles and this field winding is connected in series with the armature windings. The field structure thus applies to the armature a polarizing field having a magnitude which at relatively low speeds varies principally as a function of the current in the series-connected windings and which at relatively high speeds is reinforced by the field of the magnetized material thereby providing a substantial counter E.M.F. in the armature windings at substantially all speeds.

Brief description of the drawings

Corresponding reference characters indicate corresponding parts throughout the several views of the drawings.

Description of the preferred embodiment

Figure 1:
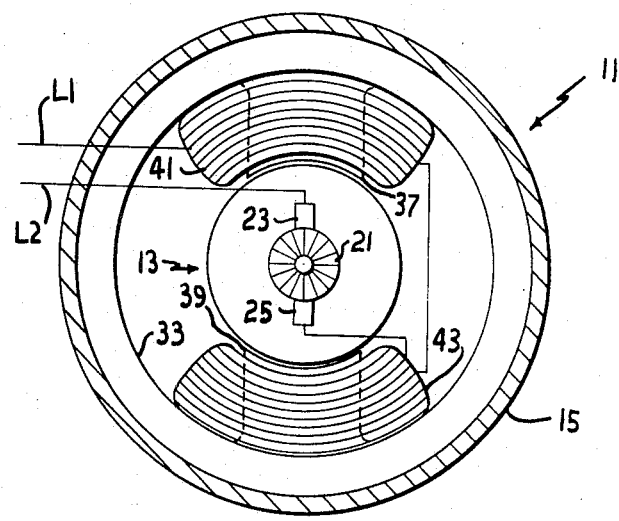
FIG. 1 is an end view, with parts broken away, of a series connected D.C. motor of this invention.
Figure 2:
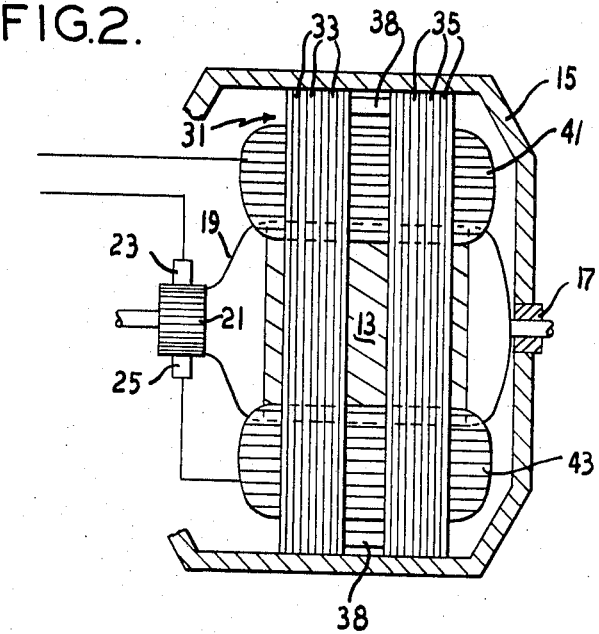
FIG. 2 is a side view partially in section of the motor of FIG. 1.

Referring now to FIGS. 1 and 2 there is indicated generally at 11 a series connected D.C. motor of the present invention. By the term D.C. motor is meant a motor which may be operated on D.C. although it may also be operated on rectified or pulsating uni-directional current in the manner of a so-called universal motor. Motor 11 includes an essentially conventional armature 13 journalled in a frame or housing 15 by means of bearings, one of which is indicated at 17. Armature 13 includes windings 19 thereon and a commutator 21 for applying current to these windings. Current is applied to commutator 21 through a pair of brushes 23 and 25.

Also mounted within frame 15 is a field structure 31. Field structure 31 includes a first set of laminations 33 which are constructed of a magnetizable material of high permeability such as soft iron and a second set of laminations 35 which are constructed of a ductile material which has a high retentivity and can thus be permanently magnetized. An example of such a permanently magnetizable material is the alloy sold under the generic name cunife.

The laminations 33 and 35 are similarly shaped and define substantially parallel magnetic circuits having poles 37 and 39 which are magnetically coupled to said armature. The laminations 33 and 35 are separated from each other by nonmagnetic spacers 38 which prevent any retained or permanent magnetism of the laminations 35 from being shunted through the laminations 33 rather than passing through armature 13.

Poles 37 and 39 are provided with respective windings 41 and 43 both of which link both of the parallel magnetic circuits defined by the laminations 33 and 35. Windings 41 and 43 are connected in series with each other and with the armature winding circuit across a pair of supply leads L1 and L2 through which current can be applied to the motor for polarizing the poles 37 and 39 and energizing armature windings 19.

Figure 3:
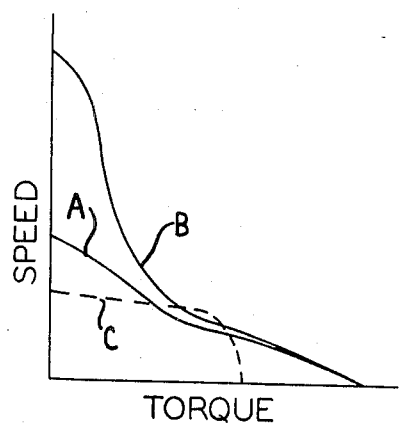
FIG. 3 is a graph representing the speed-torque characteristics of the motor of FIGS. 1 and 2 in relation to the characteristics of conventional series and shunt connected D.C. motors.

In FIG. 3, curve A which represents the speed-torque characteristic of the motor of FIG. 1 is contrasted with curves B and C representing the speed-torque characteristics of conventional series and shunt connected motors respectively. At low speeds, the motor 11 behaves essentially as a conventional series motor in that the polarizing field applied by the field structure 31 to the armature 13 varies principally as a function of the current in the field windings 41 and 43 and thus high torque is available. However, at higher speeds, when the current in the series-connected windings falls to a lower level, the polarizing field provided by the field of the motor 11 constructed according to the present invention is reinforced by the field of the permanently magnetized laminations 35 so that a substantial counter E.M.F. continues to be generated in the armature windings 19. Accordingly, the speed of the motor 11 does not tend to "run away" in the manner of the conventional series motor as represented in FIG. 3 by the left-hand portion of curve B but rather maintains a more constant speed with varying torque loads somewhat like the shunt motor. Since a counter E.M.F. continues to be developed in the armature winding 19 even though the current in the field windings 41 and 43 falls to a low level, it can be seen that the motor 11 may be dynamically braked by shorting the armature winding circuit even though no polarizing current is applied to the field windings 41 and 43.

Figure 4:
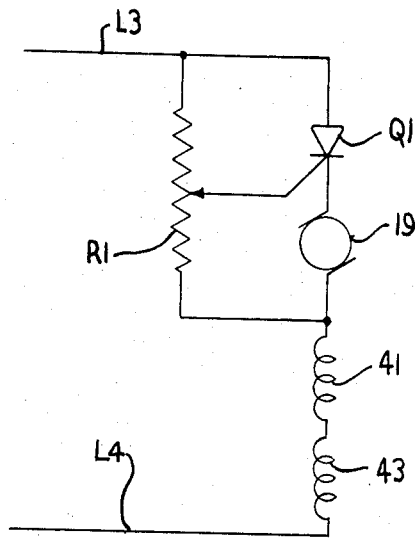
FIG. 4 is a schematic circuit diagram of an electronic speed control for the motor of FIG. 1.

The presence of a substantial counter E.M.F. in the armature windings 19 at all appreciable speeds also permits the speed of motor 11 to be controlled by electronic circuits which employ the armature voltage as an indication of motor speed. In the circuit illustrated in FIG. 4, motor 11 is energized on rectified A.C. and the amount of power applied to the motor is modulated by varying the phase angle of firing of an SCR (silicon controlled rectifier) Q1. SCR Q1 is connected in series with armature winding 19 and field windings 41 and 43 across a pair of A.C. supply leads L3 and L4. A potentiometer R1 is connected across the anode-cathode circuit of SCR Q1 and the armature windings 19. The movable tap of potentiometer R1 is connected to the gate terminal of SCR Q1.

SCR Q1 conducts only on those A.C. half cycles when lead L3 is positive with respect to lead L4. On such half cycles before the SCR Q1 fires, substantially the full line voltage appears across potentiometer R1. A pre-selected portion of this voltage is applied to the gate terminal of SCR Q1 through the tap of potentiometer R1.

The voltage present at the cathode of SCR Q1 depends upon the counter E.M.F. generated in the armature winding 19 and hence also upon the speed of the armature. SCR Q1 is triggered into conduction substantially when the pre-selected portion of the voltage across potentiometer R1 exceeds the counter E.M.F. Accordingly, it can be seen that the phase angle of triggering of SCR Q1 and the power applied to motor 11 will depend upon and vary as a function the speed of the armature. This variation in the energization of the motor in response to variations in its speed tends to maintain the motor speed at a predetermined level selected by the adjustment of the potentiometer R1 despite variations in load.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A D.C. series motor comprising:
   an armature including windings thereon and commutator means for applying current to said windings;
   a field structure having a plurality of poles which are magnetically coupled to said armature, said field structure including at least first and second substantially parallel magnetic circuit means one of which is constructed of a magnetizable material of relatively high permeability and the other of which is constructed of a magnetized material of relatively high retentivity; and
   a field winding on said field structure electrically connected in series relationship with said armature windings and magnetically linking both of said magnetic circuit means for polarizing said poles in a manner so that the polarizing field has a magnitude which at relatively low speeds varies principally as a function of the current in said series-connected windings and which at relatively high speeds is reinforced by the field of said other magnetic circuit means thereby providing a substantial counter E.M.F. in said armature windings at substantially all speeds.

2. A D.C. series motor as set forth in claim 1 wherein each of said magnetic circuit means comprises a plurality of laminations.

3. A D.C. series motor as set forth in claim 2 wherein the laminations of said first magnetic circuit means are constructed of soft iron and the laminations of said second magnetic circuit means are constructed of cunife alloy.

References Cited

UNITED STATES PATENTS

| | | | |
|---|---|---|---|
| 1,860,728 | 5/1932 | Bindschedler | 310—158 |
| 2,689,327 | 9/1954 | Haas | 310—155 X |

FOREIGN PATENTS 325,056  2/1930  Great Britain.

WARREN E. RAY, Primary Examiner

U.S. Cl. X.R.

310—181, 187; 318—249, 331